US 8,027,406 B2

(12) United States Patent
Abe (10) Patent No.: US 8,027,406 B2
(45) Date of Patent: Sep. 27, 2011

(54) TRANSMITTER

(75) Inventor: Tatsuya Abe, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 801 days.

(21) Appl. No.: 11/991,555

(22) PCT Filed: Sep. 1, 2006

(86) PCT No.: PCT/JP2006/317805
§ 371 (c)(1),
(2), (4) Date: Mar. 6, 2008

(87) PCT Pub. No.: WO2007/034687
PCT Pub. Date: Mar. 29, 2007

(65) Prior Publication Data
US 2009/0225898 A1    Sep. 10, 2009

(30) Foreign Application Priority Data

Sep. 21, 2005  (JP) .................................. 2005-273751

(51) Int. Cl.
*H04L 25/49* (2006.01)
(52) U.S. Cl. ........ 375/296; 375/260; 375/267; 375/295; 375/297
(58) Field of Classification Search .................. 375/295, 375/296, 260, 267; 370/203, 204, 205, 206, 370/207, 208, 209, 210
See application file for complete search history.

(56) References Cited

U.S. PATENT DOCUMENTS

| 2004/0090283 A1 | 5/2004 | Naito |
| 2004/0203430 A1* | 10/2004 | Morris ..................... 455/67.11 |
| 2004/0258175 A1* | 12/2004 | Vuopala et al. ............... 375/295 |
| 2005/0063485 A1 | 3/2005 | Hasegawa et al. |

FOREIGN PATENT DOCUMENTS

| JP | 2002-44054 | 2/2002 |
| JP | 2004-104162 | 4/2004 |
| JP | 2004-166245 | 6/2004 |
| JP | 2005-94426 | 4/2005 |

OTHER PUBLICATIONS

International Search Report issued Nov. 7, 2006 in the International (PCT) Application of which the present application is the U.S. National Stage.

* cited by examiner

*Primary Examiner* — Shuwang Liu
*Assistant Examiner* — Dhaval Patel
(74) *Attorney, Agent, or Firm* — Wenderoth Lind & Ponack, L.L.P.

(57) ABSTRACT

A transmitter processes signals to be transmitted. The transmitter reduces the peak power generated in a transmission signal, even when many peaks exist. In the transmitter, the peaks of the transmission target signals are detected, and a peak suppression coefficient for suppressing the detected peaks is generated. The levels of the transmission target signals are suppressed using the peak suppression coefficient generated.

2 Claims, 6 Drawing Sheets

TRANSMITTER

BACKGROUND OF THE INVENTION

1. Technical Field

The present invention relates to a transmitter to be used in a mobile communication system or the like and, more particularly, to a transmitter for effectively reducing a peak power to occur in a signal to be transmitted.

2. Background Art

In a transmitter of a mobile communication system for performing radio communications by adopting the code division multiple access (CDMA) system, it is performed by a digital modulation unit to process the transmission target signal (or the signal to be transmitted).

In the digital modulation unit, for example, a plurality of N-number carrier signals are individually wave-shaped by wave-form shaping filters and are then modulated by digital orthogonal modulation units. These modulation results are added for the N-number carriers by adders and are outputted.

In this transmitter, for the intermediate frequency signals (i.e., the output signals from those adders) after the individual carrier synthesizations, the peripheries of peaks are multiplied by a window function thereby to suppress the peaks (as referred to Patent Document 1, for example).

Patent Document 1: JP-A-2005-20505

SUMMARY OF THE INVENTION

Figure 6:
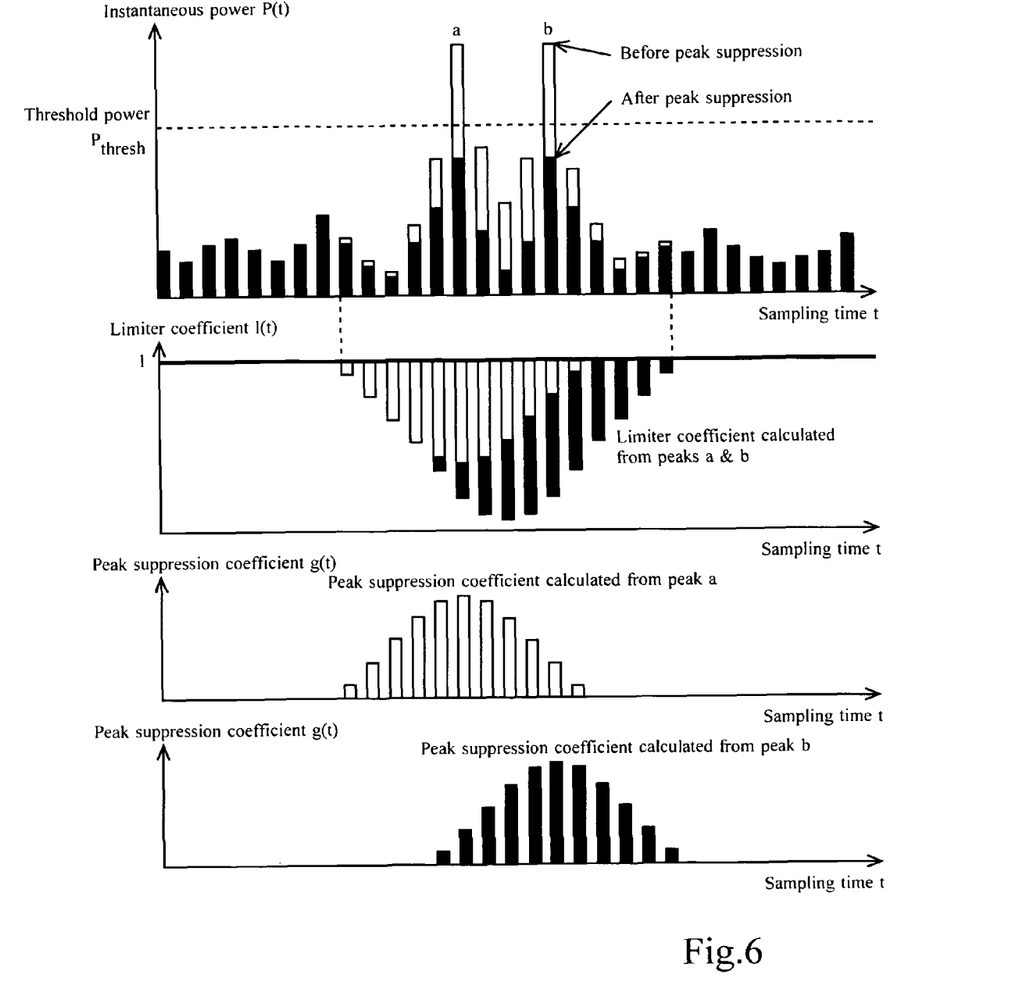
FIG. 6 is a diagram showing the behaviors of the peak power suppression of the case, in which the peak suppression ratio is not corrected.

In the transmitter of the prior art, however, if a plurality of peaks exist in the transmission target signal at positions (or at near times) close to each other, for example, as shown in FIG. 6, a peak suppression coefficient made due to one peak and a peak suppression coefficient due to another peak superpose each other to reduce the level of the transmission target signal excessively, thereby to raise a problem that the baseband symbol to be transmitted deviates from the intrinsic position to deteriorate the EVM (Error Vector Magnitude). Especially the signal transmission adopting the CDMA system has a problem that the PCDE (Peak Code Domain Error) is also deteriorated. If the level of the transmission target signal is excessively lowered in the periphery of a peak so that the average power drops, moreover, this influence offsets the reducing effect of the PAPR (Peak to Average Power Ratio) obtained by the suppression of only the peak power, thereby to raise a problem that the power efficiency of a power amplifier cannot be effectively raised.

Here, FIG. 6 presents the behaviors of a peak power suppression of the case, in which the peak suppression ratio is not corrected, so that they may be compared with those of embodiments of the invention. In a manner to match that a peak a and a peak b are identical instantaneous powers, as shown in FIG. 6, the peak suppression coefficient calculated from the peak a and the peak suppression coefficient calculated from the peak b are identical in magnitudes, so that the instantaneous powers of the peak a and the peak b are suppressed to values far lower than a threshold power by limiter coefficients calculated from the two peak suppression coefficients.

The present invention has been conceived in view of those backgrounds of the prior art, and has an object to provide a transmitter, which can perform both the suppression of the peak level of a transmission target signal and the reduction of an out-band leakage power effectively.

In order to achieve the aforementioned object, a transmitter according to the invention processes a signal to be transmitted, with the following constitution.

Specifically, coefficient generating means detects the peaks of the levels of transmission target signals, and generates a peak suppression coefficient for suppressing those peaks altogether on the basis of the peaks detected. Transmission target signal level suppressing means suppresses the levels of the transmission target signals with the peak suppression coefficient generated by the coefficient generating means.

In case a plurality of peaks exist in the transmission target signals at positions (or at near times) close to each other, for example, a peak suppression coefficient for suppressing those peaks altogether is generated so that the peak level to occur in the transmission target signals can be effectively reduced. Specifically, it is possible to perform both the suppression of the peak level of the transmission target signal and the reduction of the out-band leakage power effectively.

Here, various signals may be used as the transmission target signals.

Moreover, the level of the signals may also be exemplified by various ones such as the level of an electric power, the level of a voltage.

Moreover, the number of peaks to be suppressed altogether by one peak suppression coefficient may be various such as two or three or more.

In one example of the constitution of the transmitter according to the invention, the aforementioned coefficient generating means performs the following operations.

Specifically, level detecting means detects the levels of the transmission target signals. Threshold value outputting means outputs a threshold value on the levels of the transmission target signals. Peak detecting means detects the level, which is detected by the level detecting means and is equal to or more (or exceeds) the threshold value outputted from the threshold value outputting means, as the peak. Time section detecting means detects the time position of a timely first peak, the time position of a timely last peak, and the highest level of the peak, in a predetermined time section. Peak suppression ratio generating means generates a predetermined peak suppression ratio on the basis of the threshold value outputted by the threshold value outputting means and the level detected by the time section detecting means (i.e., the level of the peak for the highest level). Peak suppression ratio correcting means corrects the peak suppression ratio generated by the peak suppression ratio generating means, on the basis of the time position of the timely first peak and the time position off the timely last peak detected by the time section detecting means. Peak suppression coefficient generating means generates the peak suppression coefficient on the basis of a predetermined time position based on the time position of the timely first peak and the time position of the timely last peak, and the peak suppression ratio corrected by the peak suppression ratio correcting means.

Therefore, the peaks having occurred in the predetermined time section can be effectively suppressed altogether.

Here, various values may be used as the threshold value on the level of the transmission target signals. The constitution may be made such that the threshold value outputting means is made of a memory to store the threshold value in advance, or such that the threshold value outputting means generates the threshold value on the basis of the levels of the transmission target signals or their average.

Moreover, the predetermined time section for detecting the peaks may also be exemplified by those having various lengths.

In case only one peak is detected in the predetermined time section, for example, its time position is used as the time position of the timely first peak or the time position of the timely last peak.

Moreover, various ones may also be used as the predetermined peak suppression ratio such as the ratio, in which the level of the peak for the highest level in the predetermined time section can be lowered to the threshold value (or lower than the threshold value).

Moreover, various ones may also be used as the corrected peak suppression ratio such as the ratio, which is considered to reduce a plurality of peaks properly in the predetermined time section. For example, the level of the peak for the highest level in the predetermined time section can be reduced to the threshold value (or made lower than the threshold value) at the time position of the timely first peak and at the time position of the timely last peak in the predetermined time section.

Moreover, various ones may also be used as the predetermined time position, which is referred to when the peak suppression coefficient is generated and which is based on the time position of the timely first peak and the time position of the timely last peak. For example, it is possible to use the time position of the central (or center) of those two time positions.

DETAILED DESCRIPTION OF THE INVENTION

An embodiment according to the invention is described with reference to the accompanying drawings.

This embodiment shows the case, in which the invention is applied to a transmitter disposed in the base station apparatus of a radio communication system adopting the CDMA system. Generally, this transmitter performs a signal amplification of a high power by an amplifier. Although the suppression quantity of a peak level can be limited, the invention can also be applied to a modulation system such as an OFDM (Orthogonal Frequency Division Multiplexing) system.

Figure 1:
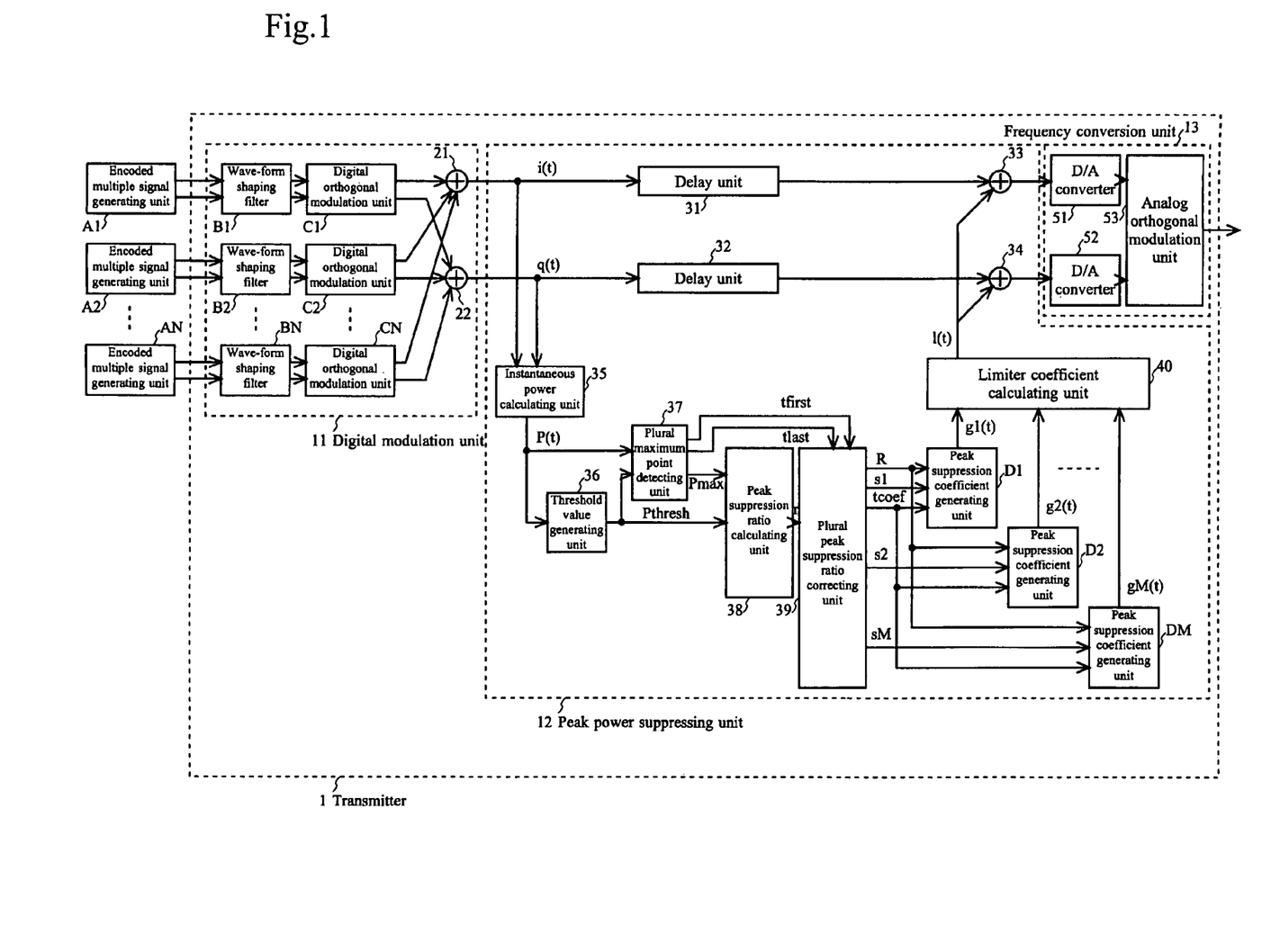
FIG. 1 is a diagram showing a constitution example of a transmitter according to one embodiment of the invention.

FIG. 1 shows a constitution example of a transmitter 1 of this embodiment.

The transmitter 1 of this embodiment is so connected with an N-number of encoded multiple signal generating units A1 to AN as to match an N-number of carriers.

The transmitter 1 of this embodiment is provided with a digital modulation unit 11, a peak power suppressing unit 12 and a frequency conversion unit 13.

The digital modulation unit 11 is so equipped with an N-number of wave-form shaping filters B1 to BN and an N-number of digital orthogonal modulation units C1 to CN as to match the N-number of carriers, and is so equipped with two adders 21 and 22 as to match a component of an I-phase (i.e., an I-component) and a component of an Q-phase (i.e., a Q-component).

The peak power suppressing unit 12 is so equipped with two delay units 31 and 32 and two multipliers 33 and 34 as to match the I-component and the Q-component, and is further equipped, as processing units for generating the peak suppression coefficients, with an instantaneous power calculating unit 35, a threshold value generating unit 36, a plural maximum point detecting unit 37, a peak suppression ratio calculating unit 38, a plural peak suppression ratio correcting unit 39, a limiter coefficient calculating unit 40, and a plurality of M-number of peak suppression coefficient generating units D1 to DM.

The frequency conversion unit 13 is so equipped with two D/A (Digital-to-Analog) converters 51 and 52 as to match the I-component and the Q-component, and is so equipped with an analog orthogonal modulation unit 53 as is common to the I-component and the Q-component.

An example of operation performed in the transmitter according to the invention is explained below.

Here, letter t designates the time (or a sampling time) of sampling the signals at or subsequent to the digital orthogonal modulation units C1 to CN.

Each of the wave-form shaping filters B1 to BN inputs, for the individual I-component and Q-component, the signal of each carrier, which is diffusion-modulated and synthesized by each of the encoded multiple signal generating units A1 to AN, shapes the spectrums so that the occupied band of the input signal may be confined in a preset value, and outputs the I-component and the Q-component of the spectral shaping result to each of the digital orthogonal modulation units C1 to CN.

Each of the digital orthogonal modulation units C1 to CN modulates the signal of each carrier, as is inputted from each of the wave-form shaping filters B1 to BN, digitally orthogonally, outputs the I-component of the digitally orthogonally modulated result, to one adder 21, and outputs the Q-component of the digitally orthogonal modulation result to the other adder 22.

One adder 21 adds (or synthesizes), for the I-component, the digitally orthogonal modulation results inputted from the N-number of digital orthogonal modulation units C1 to CN, and outputs the signal i(t) of the addition result to the instantaneous power calculating unit 35 and one delay unit 31.

The other adder 22 adds (or synthesizes), for the Q-component, the digitally orthogonal modulation results inputted from the N-number of digital orthogonal modulation units C1 to CN, and outputs the signal q(t) of the addition result to the instantaneous power calculating unit 35 and the other delay unit 32.

The instantaneous power calculating unit 35 calculates, on the basis of the I-component i(t) and the Q-component q(t) of the addition result signals inputted from the two adders 21 and 22, an instantaneous power P(t) of that addition result signals, and outputs the calculation result to the threshold value generating unit 36 and the plural maximum point detecting unit 37. For example, the instantaneous power P(t) is expressed by Formula 1, for example:

Formula 1

$$P(t)=i(t)^2+q(t)^2 \quad \text{(Formula 1).}$$

The threshold value generating unit 36 generates, on the basis of the instantaneous power P(t) calculated by the instantaneous power calculating unit 35, a threshold power Pthresh for performing a peak suppression, and outputs the generation result to the plural maximum point detecting unit 37 and the peak suppression ratio calculating unit 38. In case the (average power+6 dB) is set as the threshold power Pthresh, the threshold power Pthresh is expressed by (Formula 2). Here, letter T designates the number of signals to be averaged, and may also be exemplified by various numbers:

Formula 2

$$Pthresh = \frac{10(6/10)}{T} \sum_{t=1}^{T} P(t). \qquad \text{(Formula 2)}$$

The plural maximum point detecting unit 37 compares, in a predetermined time section, the instantaneous power P(t) inputted from the instantaneous power calculating unit 35 and the threshold power Pthresh inputted form the threshold value generating unit 36, and outputs, in case a maximum point for the instantaneous power P(t) exceeds the threshold power Pthresh, both a sample time tfirst of the maximum point detected at first in that time section and a sample time tlast of the maximum point detected at last in that time section, to the plural peak suppression ratio correcting unit 39. In case only one maximum point for the instantaneous power P(t) to exceed the threshold power Pthresh is detected in a predetermined time section, the plural maximum point detecting unit 37 outputs the tlast and the tfirst as an identical value. Moreover, the plural maximum point detecting unit 37 outputs the highest maximum point power Pmax (i.e., the maximum instantaneous power P(t)) of the maximum points detected in that time section, to the peak suppression ratio calculating unit 38.

The peak suppression ratio calculating unit 38 calculates, on the basis of the threshold power Pthresh inputted from the threshold value generating unit 36 and the highest maximum point power Pmax inputted from the plural maximum point detecting unit 37, the peak suppression ratio r by (Formula 3), for example, and outputs the calculation result to the plural peak suppression ratio correcting unit 39.

Here in this embodiment, the maximum point power Pmax and the threshold power Pthresh are expressed in the dimensions of an electric power, so that the calculation of a root (sqrt) is performed so as to suppress the peak level in a voltage region.

Formula 3

$$r = 1 - \sqrt{\frac{Pthresh}{Pmax}}. \qquad \text{(Formula 3)}$$

The plural peak suppression ratio correcting unit 39 so calculates, on the basis of the two sample times tfirst and tlast inputted from the plural maximum point detecting unit 37 and the peak suppression ratio r inputted from the peak suppression ratio calculating unit 38, a sample time tcoef at the central (or center) of the peak suppression coefficient and a corrected peak suppression ratio R, that all the maximum point powers detected with one peak suppression coefficient for a predetermined time section may be suppressed within the threshold power Pthresh, outputs the calculation results to the peak suppression coefficient generating units D1 to DM, and outputs start signals s1 to sM to such one of the M-number of peak suppression coefficient generating units D1 to DM as is stopped in action.

Figure 2:
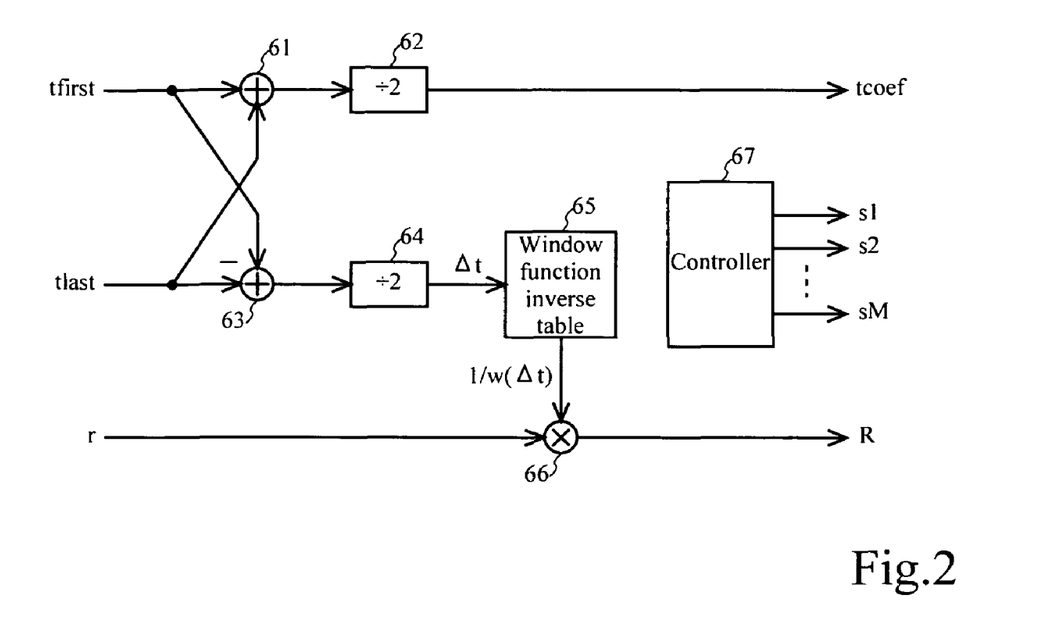
FIG. 2 is a diagram showing a constitution example of a plural peak suppression ratio correcting unit.

FIG. 2 shows a constitution example of the plural peak suppression ratio correcting unit 39, which is based on the sample time tfirst, the sample time tlast and the peak suppression ratio r.

The plural peak suppression ratio correcting unit 39 of this embodiment is equipped with an adder 61, a divider 62, an adder 63, a divider 64, a window function inverse table 65, a multiplier 66 and a controller 67.

The adder 61 adds the sample time tfirst and the sample time tlast inputted from the plural maximum point detecting unit 37, and outputs the addition result to the divider 62.

The divider 62 divides (or performs a division) the addition result inputted from the adder 61 by 2, and outputs the division result as the sample time tcoef of the central of the peak suppression coefficient to the M-number of peak suppression coefficient generating units D1 to DM. In this case, the sample time tcoef of the central of the peak suppression coefficient is the central time between the two sample times tfirst and tlast.

Here, the divider 62 can be constituted by using a shifter for shifting and outputting the input data rightward by one bit, for example. Alternatively, the divider 62 may also be realized to have a function similar to that of the divider 62 by the constitution, in which the output data is shifted rightward by one bit in the adder 61.

In this embodiment, the central sample time tcoef of the peak suppression coefficient is expressed by (Formula 4):

Formula 4

$$tcoef = \frac{tfirst + tlast}{2} \qquad \text{(Formula 4)}$$

The adder 63 subtracts the sample time tfirst from the sample time tlast inputted from the plural maximum point detecting unit 37, and outputs the subtraction result to the divider 64.

The divider 64 divides the subtraction result inputted from the adder 63, by 2 (or performs a division), and outputs the division result as a sample time difference Δt to the window function inverse table 65. In this case, the sample time difference Δt is one between tcoef and tfirst and also one between tcoef and tlast.

Here, the divider 64 can be constituted by using a shifter for shifting and outputting the input data rightward by one bit, for example. Alternatively, the divider 64 may also be realized to have a function similar to that of the divider 64 by the constitution, in which the output data is shifted rightward by one bit in the adder 63.

In this embodiment, the sample time difference Δt is expressed by (Formula 5):

Formula 5

$$\Delta t = \frac{tlast - tfirst}{2}. \qquad \text{(Formula 5)}$$

The window function inverse table 65 selects, by using the sample time difference Δt inputted from the divider 64 as a reference address, an inverse 1/w(Δt) of a window function value w(Δt) at a sample position apart by the sample time difference Δt from the center of the window function, and outputs the selection result to the multiplier 66.

In case a Hamming window is used, for example, the inverse $1/w(\Delta t)$ of the window function value is expressed by (Formula 6). Here, L designates a sample number, as exemplified by an integer of 2 or more.

Formula 6

$$\frac{1}{w(\Delta t)} = \frac{1}{0.54 + 0.46\cos(2\pi\Delta t/L)}. \quad \text{(Formula 6)}$$

The multiplier 66 multiplies the peak suppression ratio r inputted from the peak suppression ratio calculating unit 38 and the inverse $1/w(\Delta t)$ of the window function value inputted from the window function inverse table 65, calculates the multiplication result as the corrected peak suppression ratio R, and outputs the suppression ratio R to the M-number of peak suppression coefficient generating units D1 to DM.

The corrected peak suppression ration R is expressed by (Formula 7):

Formula 7

$$R = \frac{r}{w(\Delta t)}. \quad \text{(Formula 7)}$$

Generally, the peak suppression coefficient generated on the basis of the peak suppression ratio r warrants, if it is the center sample point, that the maximum point power Pmax is suppressed to the threshold power Pthresh, but the suppression degree becomes the smaller as the peak suppression coefficient goes the farther from the center. In this embodiment, therefore, when the peak suppression coefficient is generated at the central sample time tcoef between the sample time tfirst and the sample time tlast, the peak suppression ratio r is so amplified and corrected with the inverse $1/w(\Delta t)$ of the window function value and then converted into the corrected peak suppression ratio R that the highest maximum point power Pmax never fails to be suppressed to the threshold power Pthresh or less even if the highest maximum point power Pmax exists at the sample time tfirst or the sample time tlast.

After the sample time tcoef at the central of the peak suppression coefficient and the corrected peak suppression ratio R were outputted to the M-number peak suppression coefficient generating units D1 to DM, the controller 67 outputs the start signals s1 to sM to such one of the M-number peak suppression coefficient generating units D1 to DM as is stopped in action. The peak suppression coefficient generating units D1 to DM individually give, when the start signals s1 to sM are inputted from the plural peak suppression ratio correcting unit 39, weights to the corrected peak suppression ratio R with a window function w(t), for the section from the time (tcoef−L/2) to the time (tcoef+L/2), on the basis of the sample time tcoef and the corrected peak suppression ratio R inputted from the plural peak suppression ratio correcting unit 39, and output the weighted result as individual peak suppression coefficients g1(t) to gM(t) to the limiter coefficient calculating unit 40.

For example, the peak suppression coefficients g1(t) to gM(t) using the same Hamming window $\{w(t)=0.54+0.46\cos(2\pi t/L)\}$ as that of (Formula 6) are expressed by (Formula 8):

Formula 8

(1) $g1(t), g2(t), \ldots, gM(t) = R \times w(t - t\text{coef})$, for $t\text{coef}-L/2 \leq t \leq t\text{coef}+L/2$, and (2) $g1(t), g2(t), \ldots, gM(t) = 0$, for $t < t\text{coef}-L/2$ or $t\text{coef}+L/2 < t$ \quad (Formula 8).

The limiter coefficient calculating unit 40 subtracts the peak suppression coefficients g1(t) to gM(t) inputted from any of the peak suppression coefficient generating units D1 to DM, for example, from 1, calculates the subtraction result as a limiter coefficient 1(t), and outputs the limiter coefficient 1(t) to the individual multipliers 33 and 34. This case is expressed by $1(t)=1-gk(t)$ for k=1 to M.

Here, this embodiment is exemplified by the case, in which the peak suppression coefficients g1(t) to gM(t) are outputted from one of the M-number peak suppression coefficient generating units D1 to DM so that the limiter coefficient calculating unit 40 calculates the limiter coefficient 1(t) thereon. For example, however, the peak suppression coefficients g1(t) to gM(t) may also be outputted from two or more of the M-number peak suppression coefficient generating units D1 to DM, so that the results of subtracting the total of those two or more peak suppression coefficients g1(t) to gM(t) from 1 can be calculated as the limiter coefficient 1(t) by the limiter coefficient calculating unit 40.

Each of the delay units 31 and 32 delays the addition result signals i(t) and q(t) inputted from each of the adders 21 and 22, for the time period corresponding to L/2 and for the time period required from the operation to calculate the instantaneous power P(t) at the instantaneous power calculating unit 35 to the operation to calculate the limiter coefficient at the limiter coefficient calculating unit 40, and outputs the delay-adjusted signal to each of the multipliers 33 and 34.

Each of the multipliers 33 and 34 multiplies the addition result signals i(t) and q(t) inputted from each of the delay units 31 and 32 and the limiter coefficient 1(t) inputted from the limiter coefficient calculating unit 40, suppresses the peak and the peripheral signal level, and outputs the multiplication results i'(t) and q'(t) to each of the D/A converters 51 and 52. These operations are expressed by $i'(t)=1(t) \times i(t)$, and $q'(t)=1(t) \times q(t)$.

Each of the D/A converters 51 and 52 converts the digital signal inputted from each of the multipliers 33 and 34, into an analog signal, and outputs the D/A conversion result to the analog orthogonal modulation unit 53.

The analog orthogonal modulation unit 53 subjects the analog signals composed of the I-component and the Q-component and inputted from the two D/A converters 51 and 52, to analog orthogonal modulations, converts the analog signals into signals of radio frequency bands, and outputs the converted signal.

Moreover, the output signal from the analog orthogonal modulation unit 53 is amplified by the (not-shown) amplifier such as a power amplifier, and is wirelessly transmitted from the (not-shown) antenna.

Figure 3:
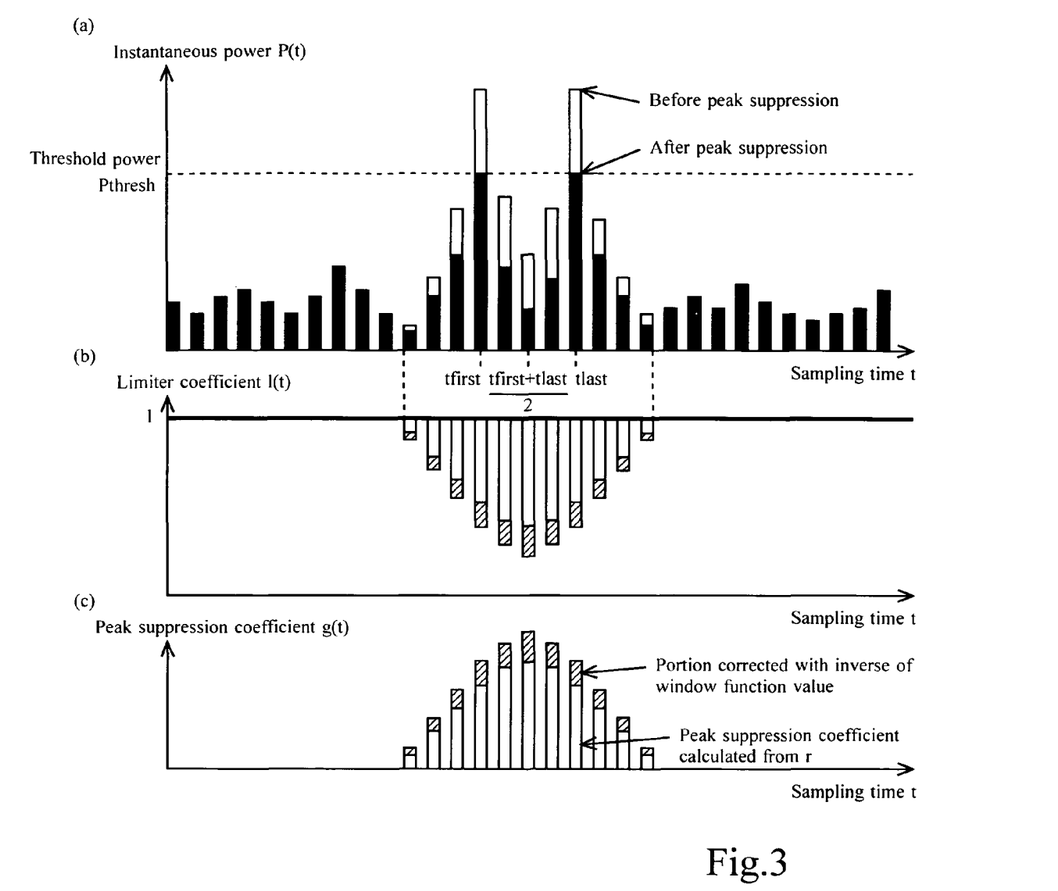
FIG. 3 is a diagram showing one example of the behavior of a peak power suppression.

FIG. 3 shows one example of the behaviors of the peak power suppressions in this embodiment.

Specifically: FIG. 3(a) shows one example of the instantaneous power P(t) on the ordinate against the sampling time (or the sampling time period) t on the abscissa; FIG. 3(b) shows one example of the limiter coefficient 1(t) on the ordinate against the sampling time (or the sampling time period) t on the abscissa; and FIG. 3(c) shows one example of the peak suppression coefficient g(t)=g1(t) to gM(t) on the ordinate against the sampling time (or the sampling time period) t on the abscissa.

In this embodiment, as shown, the instantaneous power P(t) of two peaks is suppressed to the threshold power Pthresh by the limiter coefficient calculated from one peak suppressing coefficient, thereby to attain the peak reducing effect. Moreover, this embodiment is constituted such that a plurality of peaks are suppressed altogether by one peak suppression coefficient, so that the number of peak suppression coefficient generating units D1 to DM can be made the smaller as the time section for detecting the peak is made the wider (or longer), thereby to reduce the hardware scale.

Here, this embodiment is exemplified by the case, in which two peaks occur for a predetermined time section. In case three or more peaks occur, for example, if peaks 1, 2, and P (P designates an integer of 3 or more) occur sequentially in time series in proximity to one another, these three or more peaks are suppressed altogether by designating the sample time of the peak 1 by tfirst and the sample time of the peak P by tlast.

In this embodiment, the center of the peak suppression coefficient is set at the central between the sample time tfirst and the sample time tlast, but need not be necessarily at the central. For example, it is arbitrary to use the mode, in which the center of the peak suppression coefficient is set at such a position as may minimize the magnitude of the peak suppression coefficient.

The constitution for thus controlling the center position of the peak suppression coefficient is effective for the case, in which the peaks do not have an identical size, for example. Usually, the center position of the most proper window varies with the magnitude and positional relation of the peak. Unless the characteristic deterioration raises no special problem in the system, the hardware can be simplified by setting the window position always at the central between the sample time tfirst and the sample time tlast.

In this embodiment, moreover, the sample time t of the maximum point to be detected by the plural maximum point detecting unit 37 is so limited to the two sample times tfirst and tlast as to simplify the hardware constitution. However, the sample times need not always be limited to two, but it is arbitrary to use the mode, in which the sample times t are detected by the number of maximum points.

Likewise in this embodiment, the instantaneous power P(t) of the maximum point to be detected by the plural maximum point detecting unit 37 is limited to the highest maximum point power Pmax but need not always be limited to one. In another mode, the maximum point power P(t) may be detected by the number of the maximum points.

Figure 4:
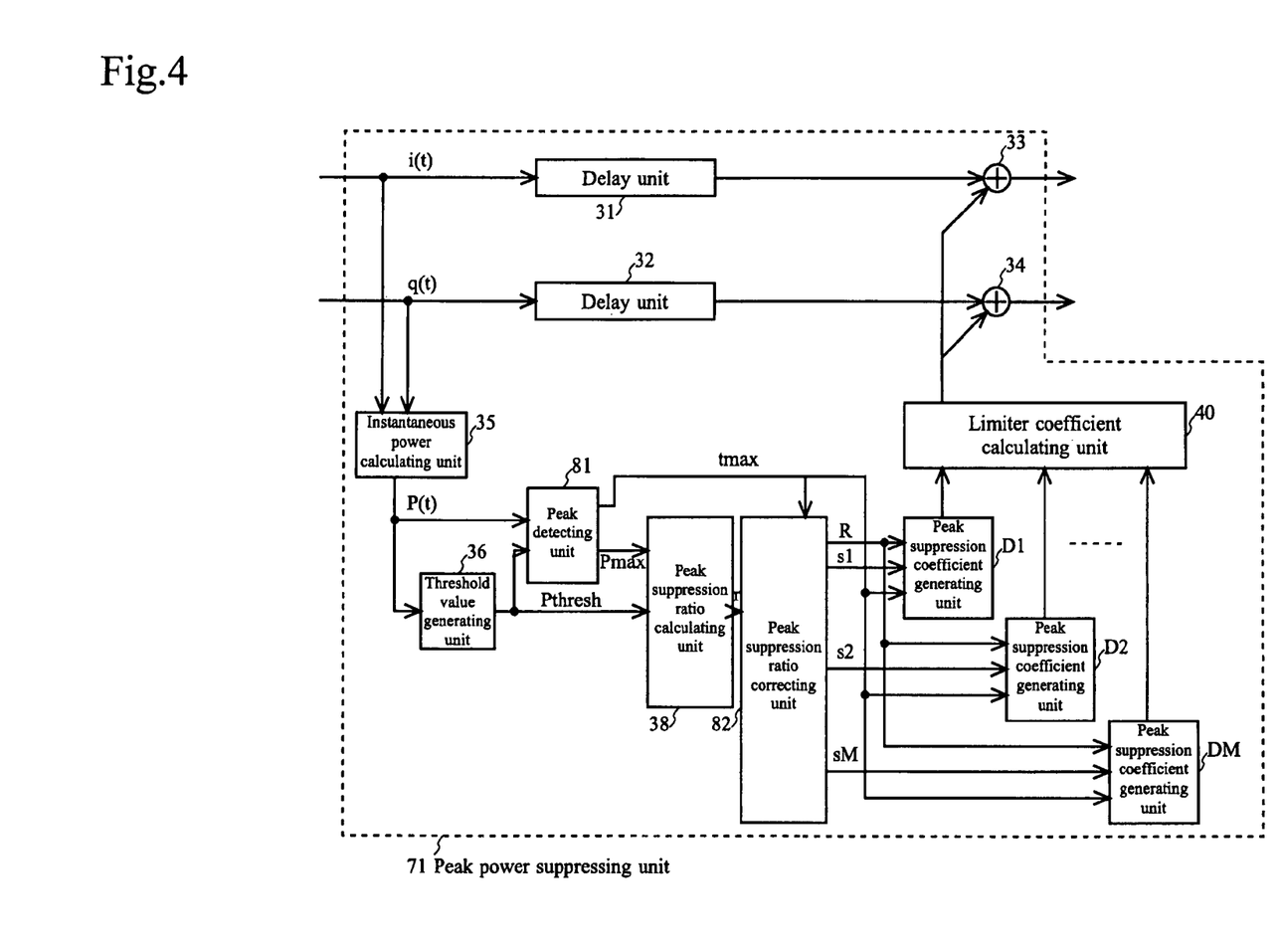
FIG. 4 is a diagram showing another constitution example of a peak power suppressing unit.
Figure 5:
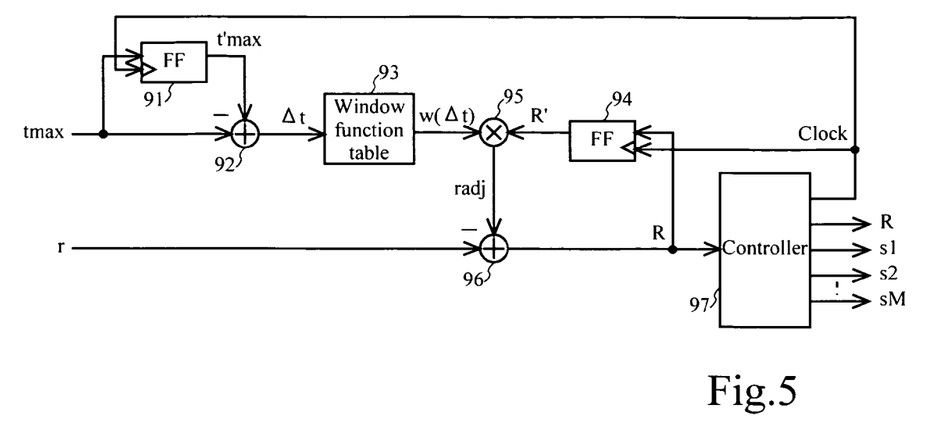
FIG. 5 is a diagram showing a constitution example of a peak suppression ratio correcting unit.

In case the peak suppression coefficients to be generated by the constitution of this embodiment are timely superposed at some sample points, for example, the constitutions shown in FIG. 4 and FIG. 5 can be combined to the mode, in which the magnitude of the peak suppression coefficient is further suppressed.

Here, this embodiment presents the case, in which the signals of plural carriers are communicated, but can also be applied to the case, in which the signals of one carrier are communicated.

In the transmitter 1 of this embodiment, as has been described hereinbefore, when the target signal is to be transmitted: the peak detecting function compares, so as to decide the peak of the target signal, the threshold power Pthresh on the level of the target signal and the level of the target signal P(t) thereby to detect the peak; the peak suppression ratio generating function generates, so as to reduce the peak of the target signal, the peak suppression ratio r according to the ratio between the threshold power Pthresh and the level Pmax of the peak; the peak suppression ratio correcting function amplifies, so as to reduce the plural proximity peaks simultaneously, the peak suppression ratio r generated by the peak suppression rage generating function in a manner to match the levels and positions of the plural peaks; the peak suppression coefficient generation timing correcting function corrects, so as to reduce the plural proximity peaks simultaneously, the timing, at which the peak suppression coefficient is generated in a manner to match the levels and positions of the plural peaks; the peak suppression coefficient generating function generates such a result as the peak suppression coefficient that the corrected peak suppression ratio R generated by the peak suppression ratio correcting function is weighted by the predetermined window function; and the sending target signal level suppressing function suppresses the target signal with the single or plural peak suppression coefficients generated by the peak suppression coefficient generating function.

In the transmitter 1 of this embodiment, therefore, the plural peak powers can be reduced by the single window function to the threshold value or less. By the processing to replace the plural peak suppression coefficients in the prior art by the single peak suppression coefficient in this embodiment, the level of the target signal can be prevented from being excessively suppressed. Specifically, it is possible to suppress the deterioration of the EVM and the deterioration of the PCDE in the CDMA system. Moreover, the reduction of the average power can be suppressed to improve the PAPR thereby to raise the efficiency of the amplifier.

Thus, in the transmitter 1 of this embodiment, the peak level can be more effectively suppressed than the prior art thereby to attain both the effects to suppress the peak level and to reduce the out-band leakage power.

Here in the transmitter 1 of this embodiment: the function of the instantaneous power calculating unit 35 constitutes level detecting means; the function of the threshold value generating unit 36 constitutes threshold value outputting means; the function of the plural maximum point detecting unit 37 constitutes peak detecting means or time section detecting means; the function of the peak suppression ratio calculating unit 38 constitutes peak suppression ratio generating means; the function of the plural peak suppression ratio correcting unit 39 constitutes peak suppression ratio correcting means; and the functions of the peak suppression coefficient generating units D1 to DM constitute peak suppression coefficient generating means. Moreover, these means constitute coefficient generating means.

In the transmitter 1 of this embodiment, moreover, the function of the limiter coefficient calculating unit 40 or the functions of the multipliers 33 and 34 constitute transmission target signal level suppressing means.

Next, another constitution example of the peak power suppressing unit is described with reference to FIG. 4 and FIG. 5.

FIG. 4 shows a constitution example of a peak power suppressing unit 71 of this embodiment.

The constitution of the peak power suppressing unit 71 is schematically different, from that of the peak power suppressing unit 12 shown in FIG. 1, in that the plural maximum point detecting unit 37 shown in FIG. 1 is replaced by a peak detecting unit 81, and in that the plural peak suppression ratio correcting unit 39 shown in FIG. 1 is replaced by a peak suppression ratio correcting unit 82.

The actions to be performed by the peak power suppressing unit 71 of this embodiment are described in detail on the points which are different from the actions to be performed by the peak power suppressing unit 12 shown in FIG. 1.

The peak detecting unit 81 compares the instantaneous power P(t) inputted from the instantaneous power calculating unit 35 and the threshold power Pthresh inputted from the threshold value generating unit 36, and outputs, in case it detects the maximum point at which the instantaneous power P (t) exceeds the threshold power Pthresh, the maximum point power Pmax of the maximum point to the peak suppression ratio calculating unit 38, and the maximum point sample time tmax of that maximum point to the peak suppression ratio correcting unit 82 and the peak suppression coefficient generating units D1 to DM.

The peak suppression ratio calculating unit 38 acts, when the maximum point exceeding the threshold power Pthresh is detected, to calculates the predetermined peak suppression ratio r according to the (Formula 3), for example, on the basis of the threshold power Pthresh inputted from the threshold value generating unit 36 and the maximum point power Pmax inputted from the peak detecting unit 81, and to output the calculation result to the peak suppression ratio correcting unit 82.

The peak suppression ratio correcting unit 82 acts, when the maximum point exceeding the threshold power Pthresh is detected, on the basis of the maximum point sample time tmax inputted from the peak detecting unit 81, the peak suppression ratio r inputted from the peak suppression ratio calculating unit 38, the single or plural maximum point sample times inputted in the past from the peak detecting unit 81, and the single or plural corrected peak suppression ratio R generated in the past in that peak suppression ratio correcting unit 82, to subtract the value of each peak suppression coefficient at the maximum point sample time tmax of each peak suppression coefficient at the center of the single or plural maximum point sample times generated in the past, from the peak suppression ratio r thereby to calculate the corrected peak suppression ratio R, and outputs the calculation result to the M-number peak suppression coefficient generating units D1 to DM and the start signal to such one of the M-number peak suppression coefficient generating units D1 to DM as is stopped in action.

FIG. 5 shows a constitution example of the peak suppression ratio correcting unit 82, which is based on the latest one maximum point sample time t'max detected in the past and the latest one corrected peak suppression ratio R' calculated in the past.

The peak suppression ratio correcting unit 82 of this embodiment is equipped with a flip-flop (FF) 91, an adder 92, a window function table 93, a flip-flop (FF) 94, a multiplier 95, an adder 96 and a controller 97, and acts when the maximum point exceeding the threshold power Pthresh is detected.

The adder 92 subtracts the past maximum point sample time t'max inputted from the flip-flop 91, from the maximum point sample time tmax inputted from the peak detecting unit 81, to calculate the difference Δt of the two adjoining maximum point sample times, and outputs the calculation result to the window function table 93. The difference Δt is expressed by (Formula 9):

Formula 9

$$\Delta t = t\text{max} - t'\text{max} \quad \text{(Formula 9)}.$$

The flip-flop 91 holds, in synchronism with the clock signal inputted from the later-described controller 97, the maximum point sample time tmax inputted from the peak detecting unit 81, as the latest maximum point sample time t'max detected in the past, and outputs the same to the adder 92.

The window function table 93 selects, by using the difference Δt inputted from the adder 92 as a reference address, the window function value w(Δt) of the sample position spaced by Δt from the center of the window function, and outputs the selection result to the multiplier 95.

In case the Hamming window is used, for example, the window function value w(Δt) is expressed as (Formula 10). Here, letter L designates a sample number indicating a multiple of 2 at or larger than 2. On the other hand, the value Δt takes its value within a section from 0 to (+L/2) ([0≦Δt≦+L/2]).

Formula 10

$$w(\Delta t) = 0.54 + 0.46 \cos(2\pi \Delta t/L) \quad \text{(Formula 10)}.$$

The multiplier 95 multiplies the window function value w(Δt) inputted from the window function table 93 and the corrected past peak suppression ratio R' inputted from the flip-flop 94, to calculate a peak suppression ratio correction value radj, and outputs the calculation result to the adder 96. In short, radj=R'×w(Δt).

Here, the peak suppression ratio correction value radj is equal to the peak suppression coefficient at the maximum point sample time tmax of the peak suppression coefficient around the later-described maximum point sample time t'max.

The adder 96 subtracts the peak suppression ratio correction value radj inputted from the multiplier 95, from the peak suppression ratio r inputted from the peak suppression ratio calculating unit 38, to calculate the corrected peak suppression ratio R, and outputs the calculation result to the controller 97 and the flip-flop 94. The corrected peak suppression ratio R is expressed by (Formula 11):

Formula 11

$$R = r - radj = \left(1 - \sqrt{\frac{Pthresh}{Pmax}}\right) - R' \times w\left(\frac{t\text{max} -}{t'\text{max}}\right). \quad \text{(formula 11)}$$

The controller 97 decides the magnitude of the corrected peak suppression ratio R inputted from the adder 96, outputs, if the corrected peak suppression ratio R is positive, the clock signal to flip-flop 91 and the flip-flop 94, outputs the corrected peak suppression ratio R to the M-number peak suppression coefficient generating units D1 to DM, and outputs the start signals s1 to sM to such one of the M-number peak suppression coefficient generating units D1 to DM as is stopped in action.

Here, in case the corrected peak suppression ratio R is 0 or negative, the maximum point power Pmax of the maximum point sample time tmax is suppressed to the threshold power Pthresh or less by the peak suppression coefficient around the maximum point sample time t'max. This means that it is unnecessary to generate the peak suppression coefficient around the maximum point sample time tmax.

The flip-flop 94 holds, in synchronism with the clock signal inputted from the controller 97, the corrected peak suppression ratio R inputted from the adder 96, as the latest corrected peak suppression ratio R' calculated in the past, and outputs the same to the multiplier 95.

Thus in one example of the peak suppression ratio correcting unit 82, the peak suppression coefficient at the maximum point sample time tmax of the peak suppression coefficient around the maximum point sample time t'max and the peak suppression coefficient at the maximum point sample time tmax of the peak suppression coefficient around the maximum point sample time tmax are synthesized by the limiter coefficient calculating unit 40 thereby to generate the peak suppression coefficient. With the peak suppression coefficient, therefore, the maximum point power Pmax at the maximum point sample time tmax can be suppressed to the threshold power Pthresh.

The M-number peak suppression coefficient generating units D1 to DM can be driven independently at the same time.

The peak suppression coefficient generating units D1 to DM so act independently of one another as to match the maximum M-number peaks to be suppressed. When the start signals s1 to sM are inputted from the peak suppression ratio correcting unit 82, for example, on the basis of the maximum point sample time tmax inputted from the peak detecting unit 81 and the corrected peak suppression ratio R inputted from the peak suppression ratio correcting unit 82, the peak suppression coefficient generating units D1 to DM weight, in the section from the time (tmax−L/2) to the time (tmax+L/2), the corrected peak suppression ratio R with the window function w(t), and output the weighted results as the individual peak suppression coefficients g'1(t) to g'M(t) to the limiter coefficient calculating unit 40.

For example, the peak suppression coefficients g'1(t) to g'M(t) using the same Hamming window w(t) as (Formula 10) are expressed by (Formula 12):

Formula 12

(1) $g'1(t), g'2(t), \ldots, g'M(t) = R \times w(t-tmax)$, for $tmax - L/2 \leq t \leq tmax + L/2$; and (2) $g'1(t), g'2(t), \ldots, g'M(t) = 0$, for $t < tmax - L/2$, or $tmax + L/2 < t$. (Formula 12).

The limiter coefficient calculating unit 40 adds all the M-number peak suppression coefficients g'1(t) to g'M(t) inputted from the peak suppression coefficient generating units D1 to DM, subtracts all addition results from 1 thereby to calculate the limiter coefficient 1(t), and outputs the calculation result to the multipliers 33 and 34. In this case, 1(t)=1−{g'1(t)+g'2(t)+ . . . +g'M(t)}.

In the constitution example shown in FIG. 4 and FIG. 5, as has been described hereinbefore: the peak detecting function compares the threshold power Pthresh on the level of the transmission target signal and the level P(t) of the transmission target signal thereby to detect the peak of the transmission target signal; the peak suppression ratio generating function generates, so as to reduce the peak of the transmission target signal, the peak suppression ratio r matching the ratio between the threshold power Pthresh and the peak level Pmax; the peak suppression ratio correcting function corrects the peak suppression ratio r generated by the peak suppression ratio generating function, in accordance with the degree, at which the peak suppression coefficient generated in the past superposes the peak suppression coefficient newly generated; the peak suppression coefficient generating function generates the result, in which the corrected peak suppression ratio R corrected by the peak suppression ratio correcting function is weighted by the predetermined window function w(t), as the peak suppression coefficient g'1(t) to g'M(t); and the transmission target signal level suppressing function suppresses the level of the transmission target signal with one or plural peak suppression coefficients generated by the peak suppression coefficient generating function.

Therefore, in case the peak suppression coefficient newly generated and the peak suppression coefficient generated in the past superpose on a time axis, the peak suppression coefficient to be newly generated is reduced according to the degree of superposition on the peak suppression coefficient generated in the past. As a result, the sum of the superposed plural peak suppression coefficients takes a proper value so that the level of the transmission target signal is not excessively suppressed. Specifically, the deterioration of the EVM and the deterioration of the PCDE can be suppressed.

Moreover, the reduction in the average power is suppressed to improve the PAPR thereby to raise the efficiency of the amplifier. As a result, the suppression of the peak level can be more effectively performed than that of the prior art, for example. Specifically, it is possible to attain both the effects of the suppression of the peak level and the reduction of the out-band leakage power.

Here, the constitution of the transmitter according to the invention should not be necessarily limited to the aforementioned ones but may be modified in various manners. Moreover, the invention can also be provided as a method or system for executing its operations, a program for realizing that method or system, or a recording medium for recording that program, or as various devices or systems.

Moreover, the application field of the invention should not be necessarily limited to the aforementioned ones but can be extended to various fields.

Moreover, the various operations to be performed in the transmitter or the like according to the invention may also be exemplified by a constitution, which is controlled when a processor in hardware resources equipped with the processor or memory executes the control program stored in a ROM (Read Only Memory), or in which the individual functional means for executing those operations are made as independent hardware circuits.

Moreover, the invention can also be grasped as the recording medium, which can be read by a computer, such as the floppy (as known under the trade name) disc or the CD (Compact Disc)-ROM stored with the aforementioned control programs, so that the operations according to the invention can be executed by inputting those control programs from that recording medium into the computer and by causing the processor to execute the control programs.

As has been described hereinbefore, the transmitter according to the invention: detects the peaks of the levels of signals to be transmitted; generates a peak suppression coefficient for suppressing those peaks altogether on the basis of the detected peaks; and suppresses the levels of the transmission target signals with the peak suppression coefficient generated. As a result, those peaks can be effectively suppressed altogether, even in case the peaks exist at positions (or times) close to each other.

The invention claimed is:

1. A transmitter for processing signals to be transmitted, comprising:
   a coefficient generating means for detecting peaks of levels of transmission target signals and for generating a peak suppression coefficient for suppressing the peaks altogether based on the peaks detected; and
   a transmission target signal level suppressing means for suppressing the levels of the transmission target signals with the peak suppression coefficient generated by the coefficient generating means,
   the coefficient generating means including:
   a level detecting means for detecting the levels of the transmission target signals;
   a threshold value outputting means for outputting a threshold value for the levels of the transmission target signals;
   a peak detecting means for detecting a level, which is detected by the level detecting means and is equal to or exceeds the threshold value outputted from the threshold value outputting means, as a detected peak;
   a time section detecting means for detecting a time position of a timely first peak, a time position of a timely last peak, and a highest level of the detected peak, in a predetermined time section;

a peak suppression ratio generating means for generating a predetermined peak suppression ratio on the basis of the threshold value outputted by the threshold value outputting means and the highest level detected by the time section detecting means;

a peak suppression ratio correcting means for correcting the peak suppression ratio generated by the peak suppression ratio generating means, on the basis of the time position of the timely first peak and the time position of the timely last peak detected by the time section detecting means; and a peak suppression coefficient generating means for generating the peak suppression coefficient on the basis of a predetermined time position based on the time position of the timely first peak and the time position of the timely last peak, and the peak suppression ratio corrected by the peak suppression ratio correcting means.

2. The transmitter of claim 1, wherein when only one peak is detected in a predetermined time section, the time position for the detected one peak is used as the time position of the timely first peak or the time position of the timely last peak.

* * * * *